(12) United States Patent
Austad

(10) Patent No.: US 10,432,261 B2
(45) Date of Patent: Oct. 1, 2019

(54) WIRELESS COMMUNICATION

(71) Applicant: Nordic Semiconductor ASA, Trondheim (NO)

(72) Inventor: Tore Austad, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 15/577,749

(22) PCT Filed: May 17, 2016

(86) PCT No.: PCT/GB2016/051424
§ 371 (c)(1),
(2) Date: Mar. 29, 2018

(87) PCT Pub. No.: WO2016/193665
PCT Pub. Date: Dec. 8, 2016

(65) Prior Publication Data
US 2018/0131408 A1    May 10, 2018

(30) Foreign Application Priority Data
May 29, 2015    (GB) .................................. 1509316.4

(51) Int. Cl.
*H04B 5/00*    (2006.01)
*H04W 76/23*    (2018.01)
(Continued)

(52) U.S. Cl.
CPC ........... *H04B 5/0031* (2013.01); *G06F 21/35* (2013.01); *G06F 21/44* (2013.01); *G06F 21/606* (2013.01);
(Continued)

(58) Field of Classification Search
CPC ................ H04B 5/00–06; H04W 4/80; H04W 12/00–12; H04W 52/00–60
(Continued)

(56) References Cited

U.S. PATENT DOCUMENTS 8,515,073 B2 * 8/2013 Arunan .................. H04L 63/068
380/273
8,744,511 B2 * 6/2014 Jones, IV ............ H04W 52/283
370/318
(Continued)

FOREIGN PATENT DOCUMENTS

EP        2582160 A1    4/2013
WO    WO 2014/060873    4/2014

OTHER PUBLICATIONS

International Search Report and Written Opinion for PCT/GB2016/051424, dated Jun. 30, 2016, 14 pages.
(Continued)

*Primary Examiner* — Sonny Trinh
(74) *Attorney, Agent, or Firm* — Klarquist Sparkman, LLP

(57) ABSTRACT

A method of transferring data between a first device and a second device comprises: bringing a first object into an activation zone of a near-field communication module so as thereby to establish a near-field communication link between the module and the first object. The near-field communication module sends a control signal to at least one of the first and second devices to begin a second communication session through a second, different channel between the first and second devices and the data is transferred between the first device and the second device in the second communication session. The second communication session is ended if the first object is removed from the activation zone.

18 Claims, 7 Drawing Sheets

(51) Int. Cl.

| | |
|---|---|
| *H04W 76/14* | (2018.01) |
| *H04W 76/11* | (2018.01) |
| *H04W 4/80* | (2018.01) |
| *G06F 21/35* | (2013.01) |
| *G06F 21/60* | (2013.01) |
| *H04L 29/06* | (2006.01) |
| *H04W 12/04* | (2009.01) |
| *G06F 21/44* | (2013.01) |
| *H04W 12/00* | (2009.01) |

(52) U.S. Cl.
CPC .......... *H04L 63/0492* (2013.01); *H04L 63/18* (2013.01); *H04W 4/80* (2018.02); *H04W 12/0027* (2019.01); *H04W 12/04* (2013.01); *H04W 76/11* (2018.02); *H04W 76/14* (2018.02); *H04W 76/23* (2018.02)

(58) Field of Classification Search
USPC ................................. 455/41.1, 41.2
See application file for complete search history.

(56) References Cited

U.S. PATENT DOCUMENTS

| | | | |
|---|---|---|---|
| 9,955,289 B1* | 4/2018 | Liu | A61N 1/025 |
| 2008/0090520 A1* | 4/2008 | Camp | H04B 5/00 |
| | | | 455/41.2 |
| 2009/0227282 A1* | 9/2009 | Miyabayashi | H04L 63/0492 |
| | | | 455/552.1 |
| 2010/0020776 A1* | 1/2010 | Youssef | H04W 64/00 |
| | | | 370/338 |
| 2011/0070825 A1* | 3/2011 | Griffin | H04B 5/0031 |
| | | | 455/41.1 |
| 2011/0070828 A1* | 3/2011 | Griffin | H04M 1/7253 |
| | | | 455/41.1 |
| 2013/0029596 A1 | 1/2013 | Preston et al. | |
| 2014/0101755 A1 | 4/2014 | Tang | |
| 2014/0127992 A1* | 5/2014 | Kuscher | H04B 5/0031 |
| | | | 455/41.1 |
| 2014/0142783 A1 | 5/2014 | Grimm et al. | |
| 2014/0219262 A1 | 8/2014 | Sun et al. | |
| 2014/0220885 A1* | 8/2014 | Chou | H04W 4/80 |
| | | | 455/41.1 |
| 2014/0220898 A1* | 8/2014 | Zhang | H04W 16/14 |
| | | | 455/41.2 |
| 2014/0254799 A1 | 9/2014 | Husted et al. | |
| 2014/0295754 A1* | 10/2014 | Lortz | H04B 5/0031 |
| | | | 455/41.1 |
| 2014/0373100 A1 | 12/2014 | Poiesz | |
| 2015/0163846 A1* | 6/2015 | Weizman | H04W 52/0225 |
| | | | 455/41.2 |

OTHER PUBLICATIONS

Search Report under Section 17(5) for GB1509316.4, dated Nov. 25, 2015, 4 pages.

* cited by examiner

WIRELESS COMMUNICATION

CROSS REFERENCE TO RELATED APPLICATIONS

This is the U.S. National Stage of International Application No. PCT/GB2016/051424, filed May 17, 2016, which was published in English under PCT Article 21(2), which in turn claims the benefit of Great Britain Application No. 1509316.4 filed May 29, 2015.

Modern electronic devices are often equipped with wireless communication hardware that allows them to communicate with other devices using a variety of communication protocols including Bluetooth®, WiFi, and ZigBee®. Another technology becoming ever more present in such devices is near-field communication (NFC), which allows short range communication between devices when they are brought into close proximity to one another, usually of the order of ten centimeters or less.

Wireless communications systems require establishing a connection between two or more compatible devices over a carrier (e.g. Bluetooth®), and may be open (i.e. a device need merely request connection with another device for a connection to be established) but are more often subject to authentication, requiring a password or a key. It is also possible that different levels of access exist such that different features provided by the carrier can be enabled or disabled.

When viewed from a first aspect, the present invention provides a method of transferring data between a first device and a second device comprising:
bringing a first object into an activation zone of a near-field communication module so as thereby to establish a near-field communication link between said module and said first object;
said near-field communication module sending a control signal to at least one of said first and second device to begin a second communication session through a second, different channel between said first and second devices;
transferring said data between said first device and said second device in said second communication session; and
ending said second communication session if said first object is removed from said activation zone.

Thus it will be seen by a person skilled in the art that the invention advantageously utilises NFC to begin a new communication session on a different channel such as Bluetooth®, Bluetooth® Low Energy, WiFi, ZigBee® etc. This allows connections to the channel to be restricted, depending on proximity between a device and an object sensed using NFC technology.

The method establishes a communication session on the second different channel, but the method can be used at a lower level of abstraction and thus in some sets of embodiments, beginning said second communication session comprises activating a communication link on the different channel.

Beginning the second communication session could comprise starting to communicate over the second channel. Equally however, it could comprise replacing or supplementing an existing communication session on the second channel. However the Applicant has also appreciated that an analogous approach could be used to alter an existing communication session. Thus when viewed from a second aspect, the present invention provides a method of transferring data between a first device and a second device comprising:
bringing a first object into an activation zone of a near-field communication module so as thereby to establish a near-field communication link between said module and said first object;
said near-field communication module sending a control signal to at least one of said first and second device to change a second communication session through a second, different channel between said first and second devices from a first state to a second state;
transferring said data between said first device and said second device in said second communication session; and
changing said second communication session from the second state to the first state if said first object is removed from said activation zone.

In some sets of embodiments of either aspect of the invention, an output power associated with said second communication session is adjusted according to a sensed proximity between said first object and said near-field communication module. This advantageous arrangement provides a method of increasing or decreasing the output power associated with the second communication session between the first and second devices, depending on the proximity between the first object and the NFC module. This can help ensure optimum power is used and thus save power.

Another variable associated with a communication session is data transfer rate. In some sets of embodiments a data transfer rate associated with said second communication session is adjusted according to a sensed proximity between said first object and said near-field communication module. When the first object is brought into close proximity with the NFC module, the rate at which data is sent between the first and second devices via the second communication session can be increased or decreased as required. This advantageous arrangement allows, by way of example only, transfer of data between said first and second devices to be performed at a higher rate if the first object is proximate to the NFC module, which may indicate that the first and second devices are physically arranged in such a way that they can support a faster connection than would otherwise be the norm.

Once the first object is within the activation zone of the near-field communication module, it is desirable to poll the first object to verify its presence. In some sets of embodiments a status check signal is sent on said near-field communication link to confirm that said first object is within the activation zone of said near-field communication module. In some sets of embodiments the status check signal is sent periodically. The first object might have been removed since initially entering the activation zone, and thus this particular arrangement provides a method of checking for such events so that the second communication session can be ended or altered as required.

In some situations, devices can connect to one another via a communication session so long as they both support the appropriate technology and protocols. In some sets of embodiments, a compatibility check signal is sent on said near-field communication link to confirm that said first and second devices support said second, different channel.

In some sets of embodiments an object identity check signal is sent on said near-field communication link to confirm the identity of said first object and said second communication channel is only activated if the identity of said first object is approved. By confirming the identity of the first object, an additional level of protection is afforded to the devices. It may also be advantageous to check the identity at later points in time to ensure the object is still what it claims to be and thus in some sets of embodiments an object identity check signal is sent on said near-field communication link to confirm the identity of said first object while the second communication channel is active.

Similarly to checking the identity of the object as discussed above, it may also be advantageous for the object to confirm the identity of the NFC module the object is to communicate with. In some sets of embodiments an NFC identity check signal is sent on said near-field communication link to confirm the identity of said near-field communication module and said second communication channel is only activated if the identity of said near-field communication module is approved. It is also advantageous to check the identity at later points in time to ensure the NFC module is still what it claims to be and thus in some sets of embodiments an NFC identity check signal is sent on said near-field communication link to confirm the identity of said near field communication module while the second communication channel is active.

In some sets of embodiments said second communication session has a greater level of security than other communication links on said second channel. By ensuring that the object is proximate to the NFC module, functions available on the second communication session that require an increased level of security can be enabled as it is physically more difficult for a malicious entity to gain access to the second communication session.

The near-field communication link is used to establish a connection session on a second, different channel typical of a chosen communication protocol, wherein said connection session on the second, different channel may be open, permitting unrestricted access to third parties. However, in some sets of embodiments said second communication session comprises an encrypted connection between said first and second devices. The separate NFC communication session is advantageously used to securely exchange parameters necessary to establish an encrypted connection between the two devices. In some sets of embodiments, the encrypted connection utilises an Advanced Encryption Standard (AES) cipher. In some further sets of embodiments, the AES cipher comprises a stream cipher. In some embodiments, the AES cipher is operated in a counter mode. In some embodiments, the encrypted connection comprises a cipher block chaining message authentication code (CBC-MAC). Combining the counter mode of operation provided by AES and a CBC-MAC is commonly referred to in the art as a "counter with CBC-MAC" or "CCM" mode. In order to initiate encrypted communications using AES-CCM, the devices must exchange both Session Key Diversifier (SKDm, SKDs) parameters and Initialization Vectors (IVm, IVs).

The protocol for achieving the AES-CCM enabled communications involves first initiating a pairing request in both directions over the second, different channel before performing a confirm value exchange via the second, different channel, and finally performing a random value exchange via NFC. The random values are exchanged via NFC because the specific transaction keys (STK) used by the second, different channel typically utilise said random values and thus transmitting them via the channel on which they are to be used is not secure.

Establishing an encrypted connection between devices typically involves a challenger device issuing a challenge to a responder device and requiring a predetermined response to be sent back by the responder device before any connection will be permitted. In some sets of embodiments one or more challenge-response parameters are automatically sent over either of said first or second communication channels.

The responses sent from the responder device to the challenger device could be sent over the second, different channel. In some sets of embodiments a near-field communication link is utilised to transfer a response to a challenge initiated on said second communication session. By sending the response over the near-field communication link, it is more difficult for third parties to eavesdrop and recover the response which could lead to reduced security.

Encrypted communication between devices typically requires said devices to share a secret key in order to prevent third parties from being able to access the content of data transferred via the encrypted connection. In some sets of embodiments of the invention, the method comprises generating a first encryption key. Once this encryption key is generated, it can be used to encrypt and decrypt data transferred over the encrypted connection. A person skilled in the art will appreciate that this encryption key need not be a single key and may comprise private and public key pairs for use in public key encryption schemes known in the art per se.

Once the encryption key(s) are generated, they can be used to encrypt and decrypt all communication between the devices from that point onwards. However, in some sets of embodiments the method comprises transferring further encryption keys over said encrypted connection. In some sets of embodiments said further encryption keys are transferred periodically. In some sets of embodiments said further encryption keys are transferred upon request. While further keys might be used for different purposes, changing the active key(s) for a particular encrypted communication link at future intervals improves security by ensuring no particular key is used for extended periods of time.

While the first object may be a standalone object such as a token or key fob, in some sets of embodiments said first device comprises said first object. In such embodiments, the first device must be brought in close proximity with the near-field communication module to establish a communication session via the second different channel with the second device.

Similarly to the embodiments outlined above, the near-field communication module may be a standalone device that enables communications between the first and second devices. However, in some sets of embodiments said second device comprises said near-field communication module. The first device could, for example, be a tablet, smartphone, or watch having NFC compatibility. In such embodiments, the first object must be brought into close proximity with the second device in order to establish a communication session via the second different channel with the first device.

A person skilled in the art will appreciate that the present invention could be utilised to establish a communication session over any communication medium known in the art. However, in preferred embodiments, said second channel is wireless. In particularly preferred embodiments, said second channel is one selected from the group comprising: Bluetooth®, Bluetooth® Low Energy, wireless local area network and ZigBee®. For example, a user wishing to connect their Bluetooth® enabled smartphone to a similar device belonging to their friend in order to transfer files such as digital photographs can bring the two devices into close proximity with one another to establish a near-field communication link that is then in turn used to perform a Bluetooth® pairing operation between the devices.

When viewed from a further aspect, the present invention extends to a system comprising a first device and a second device arranged to:
  establish a near-field communication link between a near-field communication module and a first object when said first object is brought into an activation zone of said module;
  send a control signal from said near-field communication module to at least one of said first and second device to begin a second communication session through a second, different channel between said first and second devices;
  transfer data between said first device and said second device in said second communication session; and
  end said second communication session if said first object is removed from said activation zone.

When viewed from a further aspect, the present invention extends to a near-field communication module arranged to:
  establish a near-field communication link with a first object when said first object is brought into an activation zone of said module;
  send a control signal to at least one of a first and second device to begin a second communication session through a second, different channel between said first and second devices; and
  end said second communication session if said first object is removed from said activation zone.

When viewed from a further aspect, the present invention extends to a device comprising a near-field communication module arranged to:
  establish a near-field communication link with a first object when said first object is brought into an activation zone of said module;
  send a control signal to begin a second communication session through a second, different channel between said device and a further device; and
  end said second communication session if said first object is removed from said activation zone.

Certain embodiments of the invention will now be described, by way of example only, with reference to the accompanying drawings in which.

Figure 1:
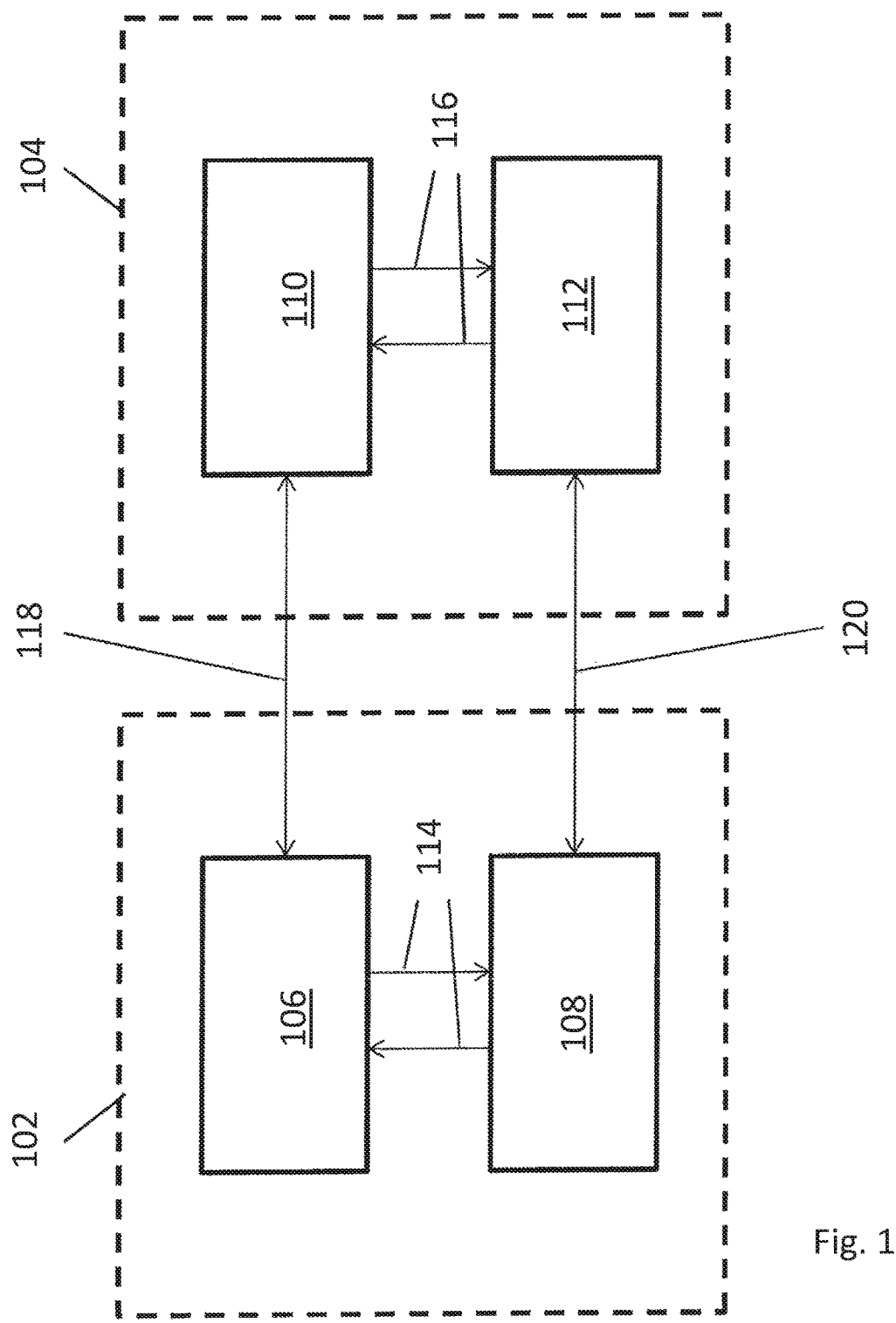
FIG. 1 shows an embodiment of the invention wherein two devices communicate via NFC to establish a second communication session via a wireless channel.

FIG. 1 shows an embodiment of the invention wherein two devices 102, 104 communicate via NFC to establish a second communication session via a wireless channel. The first device 102 comprises a first NFC module 106 and a first WLAN module 108. The second device 104 comprises a second NFC module 110 and a second WLAN module 112.

The first NFC module 106 and first WLAN module 108 communicate with one another via a series of control signals 114. Similarly, the second NFC module 110 and second WLAN module 112 communicate with one another via a series of control signals 116.

When the devices 102, 104 are brought sufficiently close to one another such that they are within the NFC activation zone (not shown), an NFC communication link 118 is established between them. The NFC modules 106, 110 send control signals 114, 116 to their respective WLAN modules 108, 112 in order to instruct them to initiate a WLAN communication session between the two devices 102, 104. Data 120 is then transferred between the devices 102, 104 via this WLAN communication system.

If the devices 102, 104 are separated such that they are no longer within range of the NFC activation zone, the NFC 118 and WLAN 120 communication sessions are terminated.

Figure 2:
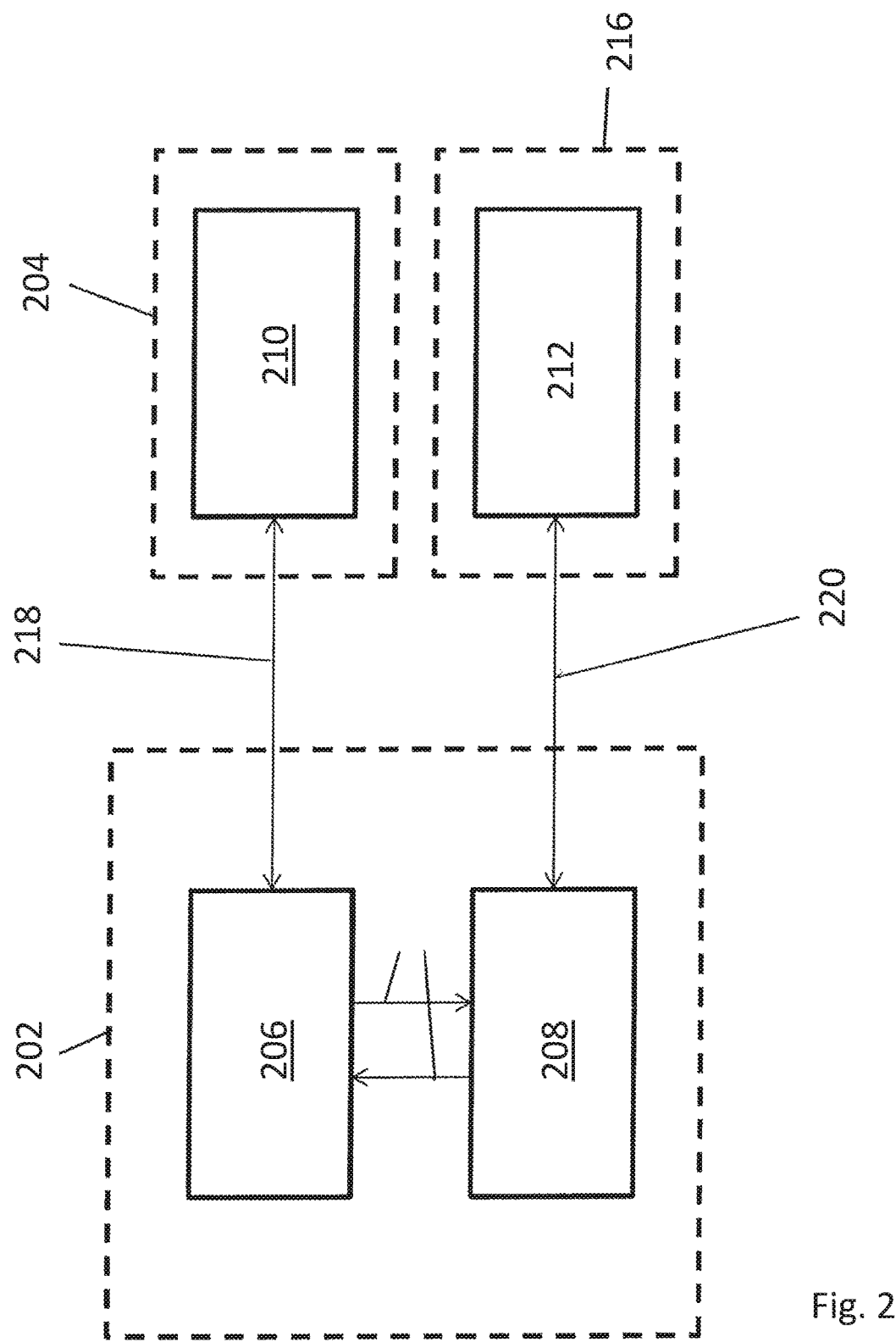
FIG. 2 shows an embodiment of the invention wherein an NFC-enabled first device is brought into close proximity with an NFC unit to establish a wireless communication session with a second device.

FIG. 2 shows an embodiment of the invention wherein an NFC-enabled first device 202 is brought into close proximity with an NFC unit 204 to establish a wireless communication session with a second device.

In this particular embodiment, the first device 202 again comprises an NFC module 206 and a WLAN module 208. The first NFC module 106 and first WLAN module 108 communicate with one another via a series of control signals 114.

The second device 216 comprises a WLAN module 212. A standalone NFC unit 204 comprises an NFC module 210. Note that there are no control signals sent between the second device and the NFC unit as they are separate devices.

When the first device 202 and NFC unit 204 are brought into each other's NFC activation zone, an NFC communication link 218 is established between the first device 202 and the NFC unit 204. Once this link 218 is established, the NFC module 206 sends control signals 214 to the first device's WLAN module 208 in order to instruct it to begin establishing a WLAN communication session with the second device 216. Data is then transferred via a WLAN communication session 220 between the first and second devices 202, 216.

If the first device 202 and the NFC unit 204 are separated, the NFC 218 and WLAN 220 communication sessions are terminated, thus severing the connection between the first and second devices 202, 216.

Figure 3A:
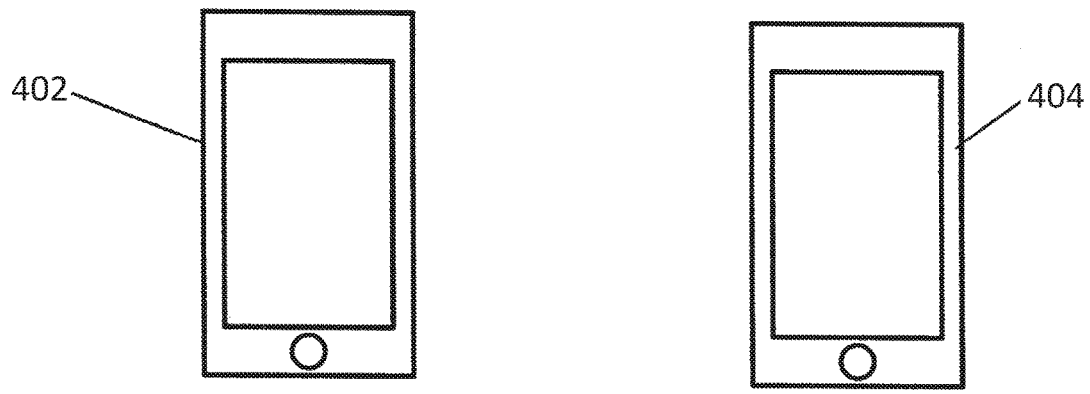
FIGS. 3A and 3B show an embodiment of the invention wherein two NFC-enabled smartphones are brought within close proximity of one another to establish a Bluetooth® connection.
Figure 3B:
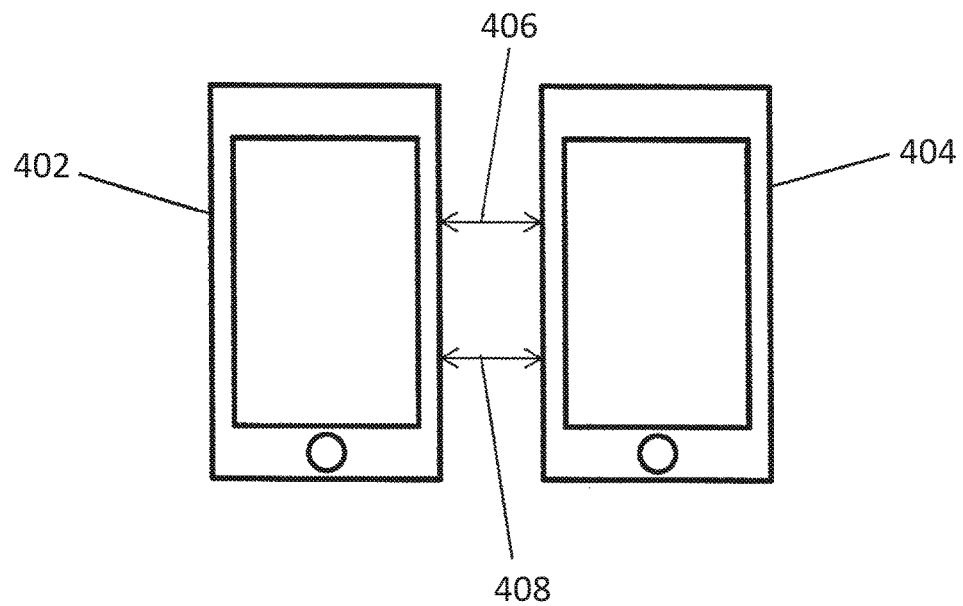

FIGS. 3A and 3B show an embodiment of the invention wherein two NFC-enabled smartphones are brought within close proximity of one another to establish a Bluetooth® connection.

With reference to FIG. 3A, two smartphones 402, 404 are both equipped with NFC and Bluetooth® modules (not shown). The smartphones 402, 404 are sufficiently far apart that no interaction with them is currently taking place.

With reference to FIG. 3B, at some time later the two smartphones 402, 404 are brought sufficiently close to one another that an NFC connection 406 is established between them. The NFC connection 406 is then used to exchange authentication data necessary to establish a Bluetooth® connection between the devices. Such authentication data may include a challenge-response scheme wherein a first of the two devices issues a "challenge" to the other device, the challenge usually comprising a string of randomly generated bits. The second device then passes a plaintext comprising the string of randomly generated bits and its address through a hash function known in the art per se, then returns the resulting hash value to the first device. Since the key used to generate the hash values is shared between trusted devices, and the first device knows the address of the second device, it too generates a hash function in the same way. The first device can then check if its local hash value matches that received from the second device, and if so allow connection. Of course, the second device may also authenticate the first device to achieve mutual authentication as is common practice in cryptography.

Once the devices have authenticated with one another, a Bluetooth® connection 408 is established between the first and second devices 402, 404. The NFC connection 406 may then be used for Secure Simple Pairing (SSP), as defined in the Bluetooth® specification, to exchange a new key between the devices to provide an encrypted communication link. Bluetooth® v4.0 supports Advanced Encryption Standard (AES), a symmetric encryption protocol (i.e. the same key is used for both encryption and decryption), typically operated in AES-CCM mode. This Bluetooth® connection 408 then provides encrypted communication between the first and second devices 402, 404. For as long as the Bluetooth® connection 408 remains active, the first and second devices 402, 404 can periodically exchange encryption keys for future use. In order to establish encrypted communication using AES-CCM, the devices exchange: master and slave Session Key Diversifier (SKDm, SKDs) parameters, and master and slave Initialization Vectors (IVm, IVs).

This arrangement then allows for refreshing the encrypted session using either the existing key or alternatively using a new key. When using a new key, the authentication or pairing procedure using NFC is repeated.

This connection will persist until the NFC connection 406 is terminated by physically separating the devices beyond the NFC activation zone (not shown), or until the Bluetooth® connection 408 is manually terminated by the user.

Figure 4:
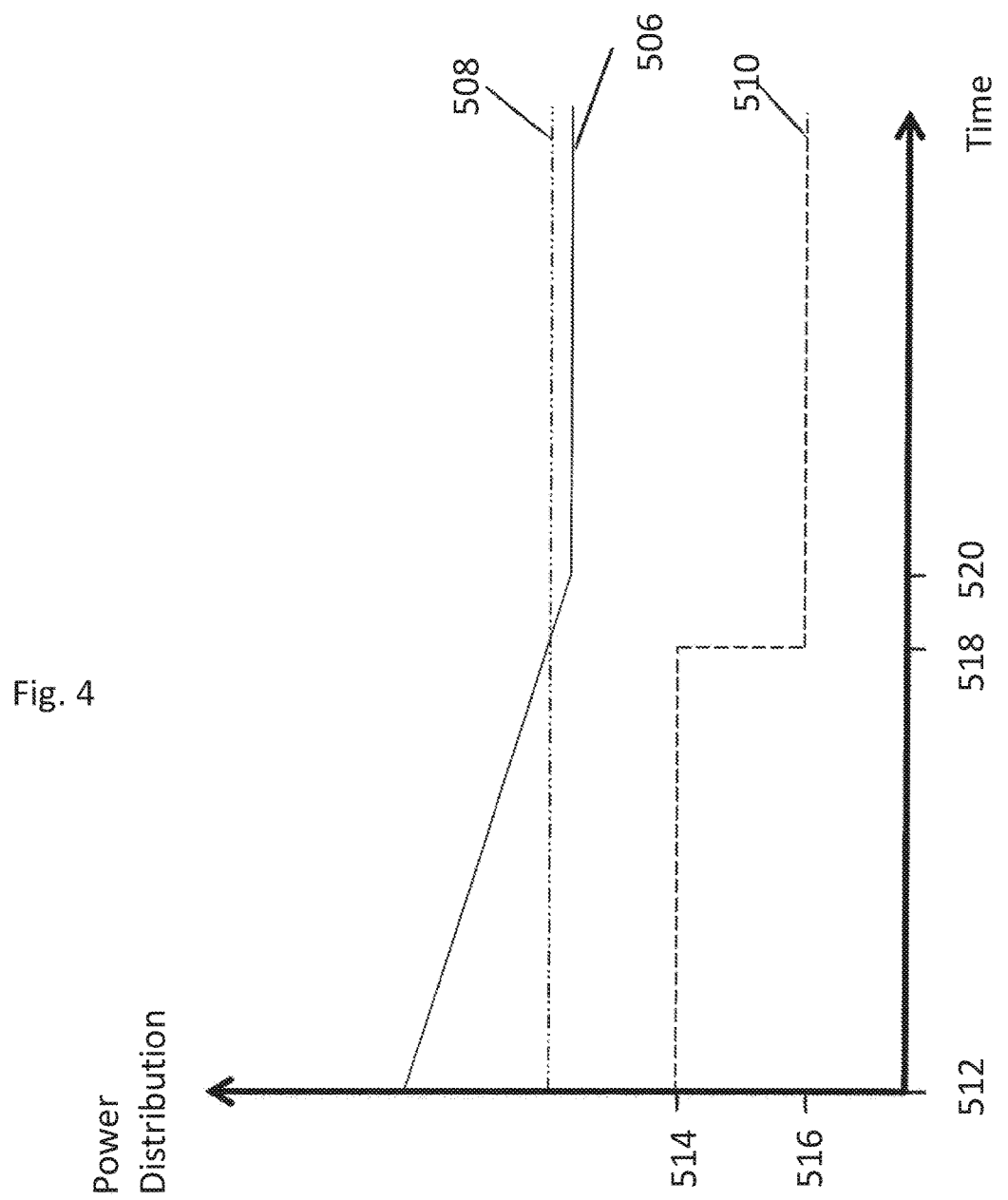
FIG. 4 shows transmission power as a function of proximity for an embodiment of the invention.

FIG. 4 shows Bluetooth® transmission power and distance against time for an embodiment of the invention. The distance between two NFC-enabled devices is shown as the solid line 506, a proximity threshold is shown as the dot-dash line 508 and the transmission power is shown as the dashed line 510.

At an initial time 512, the devices are sufficiently far apart that the distance 506 between them is greater than the proximity threshold 508. The devices transmit data to one another at an upper transmission power level 514.

The two devices are then brought closer to one another until such a time 518 that the distance 506 between the two devices is brought below the proximity threshold 508. At this point 518, the devices are determined to be sufficiently close that less power is required to successfully send data via the Bluetooth® communication link and the transmission power 510 is reduced from the upper transmission power level 514 to a lower transmission power level 516 accordingly. The devices are then kept stationary and within the NFC activation from time 520 onwards.

Figure 5:
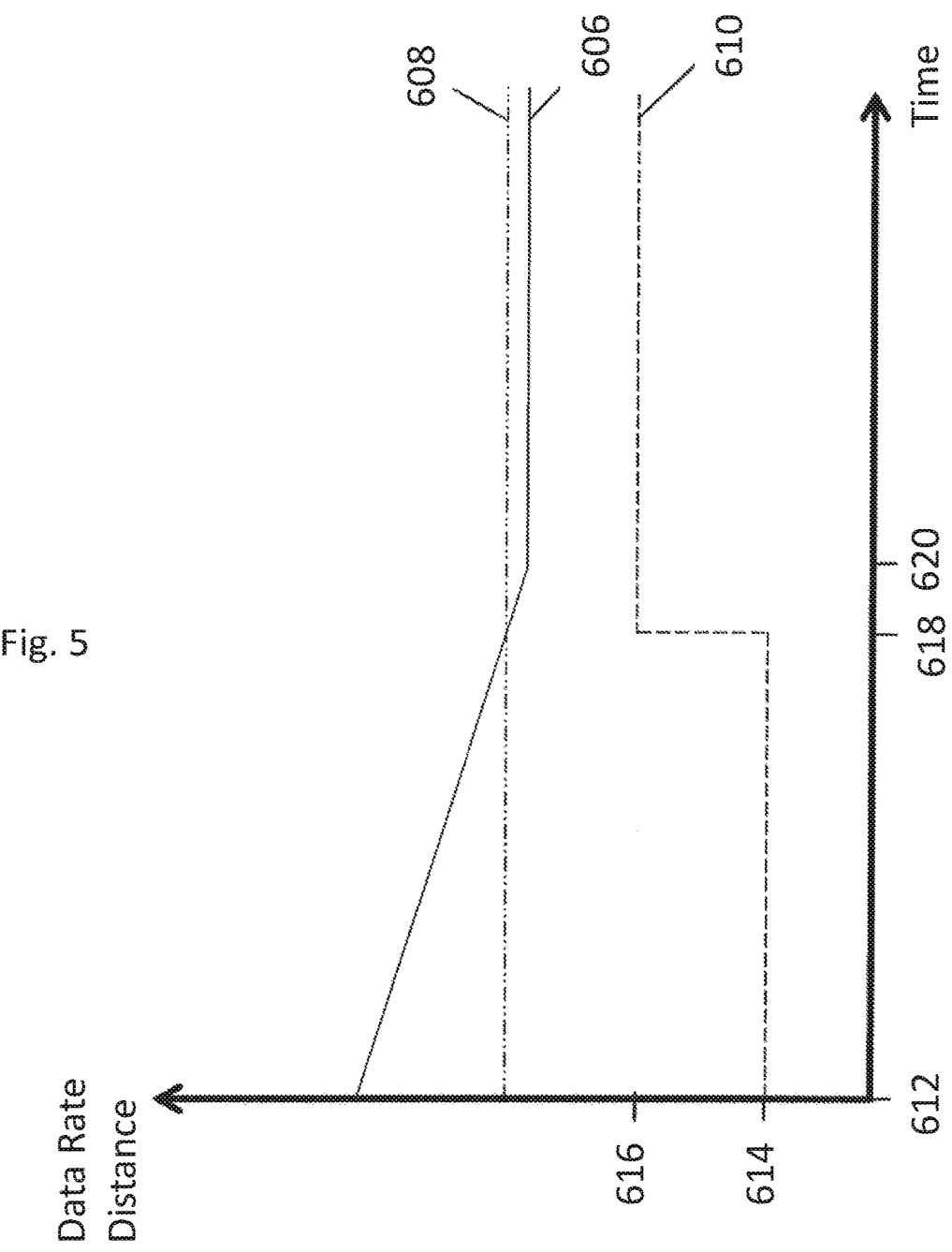
FIG. 5 shows transmission data rate as a function of proximity for an embodiment of the invention.

FIG. 5 shows Bluetooth® data rate and distance against time for an embodiment of the invention. The distance between two NFC-enabled devices is shown as the solid line 606, a proximity threshold is shown as the dot-dash line 608 and the data rate is shown as the dashed line 610.

At an initial time 612, the devices are sufficiently far apart that the distance between them is greater than the proximity threshold 608. The devices transmit data to one another at a lower data rate 614.

The two devices are then brought closer to one another until such a time 618 that the distance between the two devices is brought below the proximity threshold 608. At this point, the devices are determined to be sufficiently close that data can be sent via the Bluetooth® communication link at a higher rate without unacceptable errors and the data rate 610 is increased from the lower data rate 614 to a higher data rate 616 accordingly. The devices are then kept stationary and within the NFC activation from time 620 onwards.

Figure 6A:
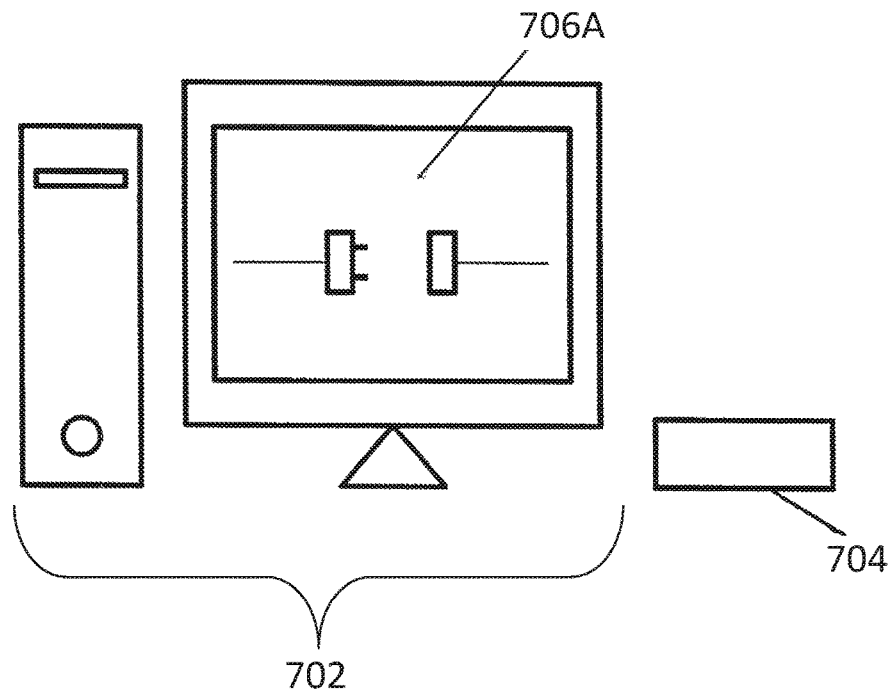
FIGS. 6A and 6B show an embodiment of the invention where an NFC key fob is used to enable a WLAN connection on a computer.

FIG. 6A shows an embodiment of the invention where an NFC key fob is used to enable a WLAN connection on a computer. A desktop computer 702 is connected to an NFC unit 704 which is used to selectively enable and disable the WLAN capabilities of the computer 702.

This system is particularly advantageous to provide parental controls to prevent children accessing the internet without supervision. In order to access the internet via the WLAN network, an NFC token possessed only by a responsible adult is required. In FIG. 6A, the token is not present and so the NFC unit 704 prevents the computer 702 from utilising WLAN, illustrated by the disconnected symbol 706A shown onscreen.

Figure 6B:
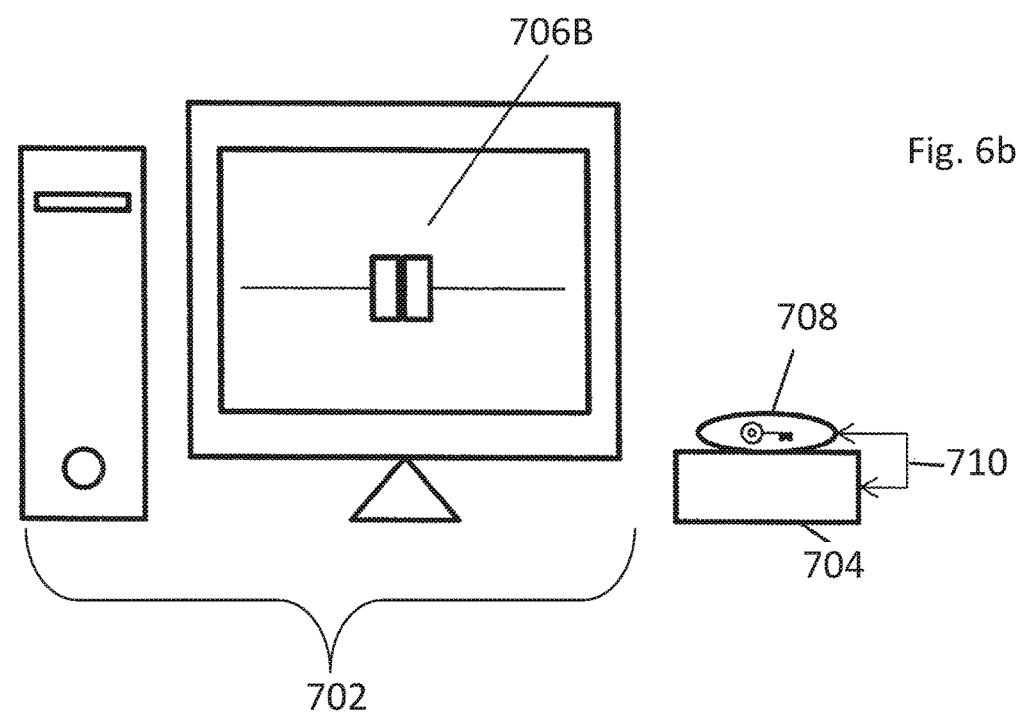

With reference to FIG. 6B, a person possessing the NFC token 708 has decided to enable the internet capabilities of the computer 702. The NFC token 708 is placed on the NFC unit 704 within its activation zone, thus enabling an NFC communication link 710. Once the NFC unit 704 has authenticated the NFC token 708, a control signal is sent to the computer 702 to enable the WLAN capabilities and thus grant users access to the internet, illustrated by the connected symbol 706B shown onscreen. Once the NFC token 708 is removed from the activation zone of the NFC unit 704, the WLAN capabilities are disabled once more, reverting the state of the computer to that as described above with reference to FIG. 6A.

Figure 7:
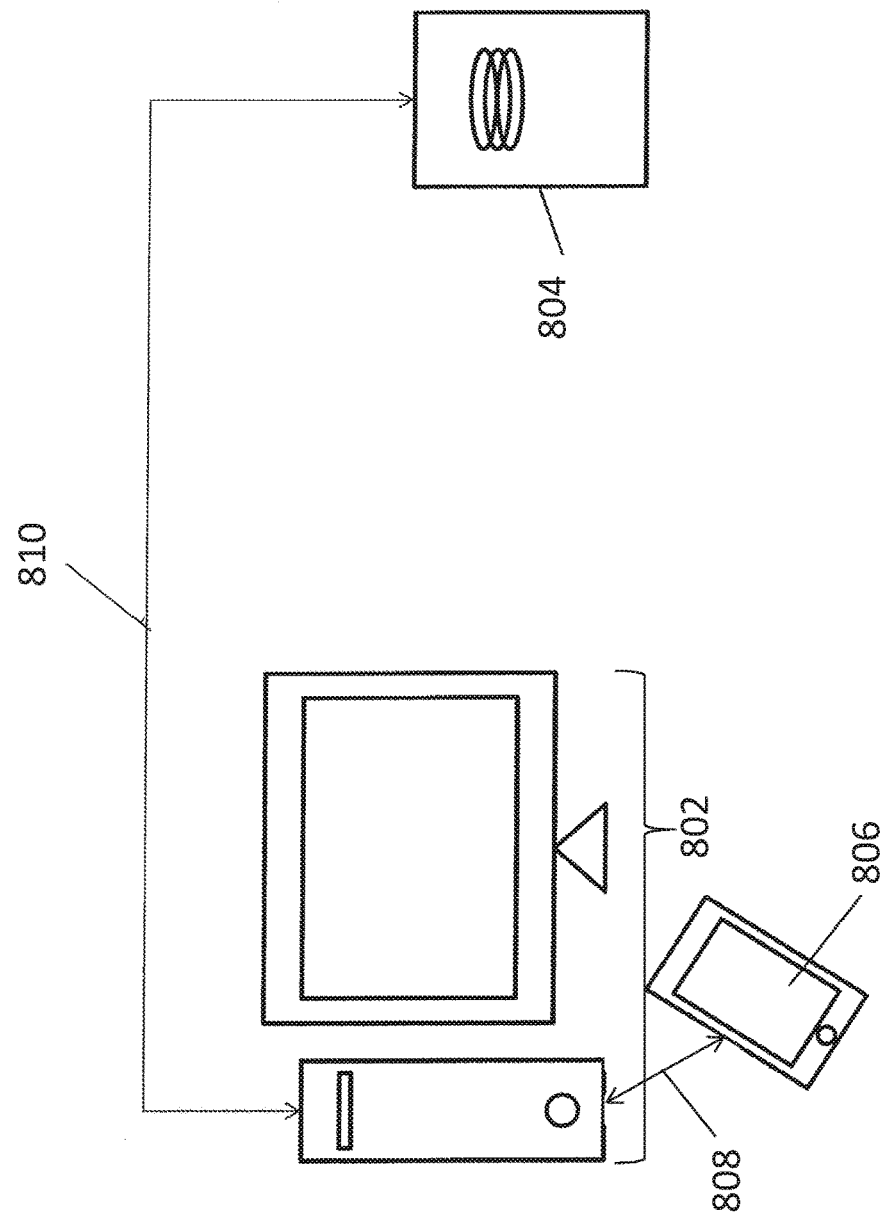
FIG. 7 shows an embodiment of the invention where an NFC-enabled smartphone is used to enable secure communications with a network storage device.

FIG. 7 shows an embodiment of the invention where an NFC-enabled smartphone is used to enable secure communications with a network storage device. A desktop computer 802 is configured to transfer data to and from a network storage device 804 via WLAN 810. In order to prevent unauthorised access to sensitive data stored on the network storage device 804, an authorised user's NFC-enabled smartphone 806 must be brought within the activation zone of an NFC module within the computer 802.

Once the smartphone 806 is within the activation zone of the computer 802, an authentication procedure is carried out via the NFC connection 808 in order to establish a secure communication link 810 with the network storage device 804. All data transferred via the secure communication link 810 is encrypted to ensure that the content is unusable to unauthorised third parties. The secure communication link 810 exists only as long as the NFC connection 808 remains active, and so removing the smartphone 806 from the NFC activation zone causes the secure communication link 810 to be terminated immediately.

Thus it will be seen that a wireless communication system has been described in which NFC can be used to enable or modify the nature of the wireless communication. Although particular embodiments have been described in detail, it will be appreciated by those skilled in the art that many variations and modifications are possible using the principles of the invention set out herein.

The invention claimed is:

1. A method of transferring data between a first device and a second device comprising:

bringing a first object into an activation zone of a near-field communication module so as thereby to establish a near-field communication link between said module and said first object;

said near-field communication module sending a control signal to at least one of said first and second device to change a second communication session through a second, different channel between said first and second devices from a first existing state to a second existing state;

transferring said data between said first device and said second device in said second communication session; and changing said second communication session from the second existing state to the first existing state if said first object is removed from said activation zone.

2. The method as claimed in claim 1, comprising adjusting an output power associated with said second communication session according to a sensed proximity between said first object and said near-field communication module.

3. The method as claimed in claim 1, comprising adjusting a data transfer rate associated with said second communication session according to a sensed proximity between said first object and said near-field communication module.

4. The method as claimed in claim 1, comprising sending a status check signal on said near-field communication link to confirm that said first object is within the activation zone of said near-field communication module.

5. The method as claimed in claim 1, comprising sending an object identity check signal or a further object identity check signal on said near-field communication link to confirm the identity of said first object while the second communication channel is active.

6. The method as claimed in claim 1, comprising sending a near-field communication module identity check signal or a further near field communication module identity check signal on said near-field communication link to confirm the identity of said near field communication module while the second communication channel is active.

7. The method as claimed in claim 1, wherein said second communication session has a greater level of security than other communication links on said second channel.

8. The method as claimed in claim 1, wherein said second communication session comprises an encrypted connection between said first and second devices.

9. The method as claimed in claim 1, comprising sending one or more challenge-response parameters automatically over either of said first or second communication channels.

10. The method as claimed in claim 1, comprising utilising a near-field communication link to transfer a response to a challenge initiated on said second communication session.

11. The method as claimed in claim 1, comprising transferring further encryption keys over said encrypted connection.

12. The method as claimed in claim 11, comprising transferring said further encryption keys upon request.

13. The method as claimed in claim 1, wherein said first device comprises said first object.

14. The method as claimed in claim 1, wherein the near-field communication module comprises a standalone device that enables communications between the first and second devices.

15. The method as claimed in claim 1, wherein said second device comprises said near-field communication module.

16. The method as claimed in claim 1, comprising adjusting a data transfer rate associated with said second communication session according to a sensed proximity between said first object and said near-field communication module.

17. A system comprising a first device and a second device arranged to:

establish a near-field communication link between a near-field communication module and a first object when said first object is brought into an activation zone of said module;

send a control signal from said near-field communication module to at least one of said first and second device to begin a second communication session through a second, different channel between said first and second devices from a first existing state to a second existing state;

transfer data between said first device and said second device in said second communication session; and change said second communication session from the second existing state to the first existing state if said first object is removed from said activation zone.

18. A near-field communication module arranged to:

establish a near-field communication link with a first object when said first object is brought into an activation zone of said module;

send a control signal to at least one of a first and second device to begin a second communication session through a second, different channel between said first and second devices from a first existing state to a second existing state; and change said second communication session from the second existing state to the first existing state if said first object is removed from said activation zone.

* * * * *